United States Patent [19]

Kocznar et al.

[11] Patent Number: 4,929,821
[45] Date of Patent: May 29, 1990

[54] METHOD OF FORGERY-PROTECTING A DATA CARRIER, A FORGERY-PROTECTED DATA CARRIER AND APPARATUSES FOR HANDLING, PROCESSING AND MONITORING THE DATA CARRIER

[75] Inventors: Wolfram Kocznar, Innsbruck; Kurt Wallerstorfer, Strasswalchen, both of Austria

[73] Assignee: Skidata Computer G.m.b.H., Gartenau-St. Leonhard, Austria

[21] Appl. No.: 127,895

[22] PCT Filed: Mar. 12, 1987

[86] PCT No.: PCT/AT87/00017

§ 371 Date: Nov. 12, 1987

§ 102(e) Date: Nov. 12, 1987

[87] PCT Pub. No.: WO87/05728

PCT Pub. Date: Sep. 24, 1987

[30] Foreign Application Priority Data

Mar. 12, 1986 [AT] Austria .................................. 644/86
Mar. 12, 1986 [AT] Austria .................................. 645/86
Mar. 12, 1986 [AT] Austria .................................. 646/86
Mar. 12, 1986 [AT] Austria .................................. 647/86
Mar. 12, 1986 [AT] Austria .................................. 648/86

[51] Int. Cl.$^5$ ............................................. G06K 19/06
[52] U.S. Cl. .................................... 235/493; 235/432; 235/449; 235/483; 235/486
[58] Field of Search ............... 235/380, 432, 449, 462, 235/483, 486, 487, 493

[56] References Cited

U.S. PATENT DOCUMENTS

| | | | |
|---|---|---|---|
| 3,953,887 | 4/1976 | Kobylarz et al. ............... | 235/483 X |
| 4,090,662 | 5/1978 | Fayling ............................. | 235/493 |
| 4,218,674 | 8/1980 | Brosow et al. . | |
| 4,293,863 | 10/1981 | Davis et al. ..................... | 346/75 |
| 4,377,741 | 3/1983 | Brekka et al. .................. | 235/432 X |
| 4,480,181 | 10/1984 | Fisher .............................. | 235/486 |
| 4,507,550 | 3/1985 | Fleer ............................... | 235/493 X |
| 4,581,523 | 4/1986 | Okuno ............................ | 235/449 X |
| 4,806,740 | 2/1989 | Gold et al. ....................... | 235/449 |

FOREIGN PATENT DOCUMENTS

| | | |
|---|---|---|
| 0172584 | 5/1986 | European Pat. Off. . |
| 2745632 | 4/1978 | Fed. Rep. of Germany . |
| 3303672 | 8/1984 | Fed. Rep. of Germany . |
| 2478349 | 9/1981 | France . |
| 2492213 | 4/1982 | France . |
| 2157866 | 10/1985 | United Kingdom . |

OTHER PUBLICATIONS

IBM Tech. Discl. Bul., vol. 20, No. 11A, pp. 4563-4564, Apr. 1978, R. J. Laybourn.
IBM Tech. Discl. Bul., vol. 27, No, 7B, pp. 4314-4315, Dec., 1984, Doody et al.
IBM Tech. Discl. Bul., vol. 20, No. 12, pp. 5423-5424, May, 1978, Sambucetti et al.

Primary Examiner—David L. Trafton
Attorney, Agent, or Firm—Lorusso & Loud

[57] ABSTRACT

Methods and apparatuses for forgery security, issuing and monitoring or reducing the value of data carriers such as value cards, entitlement cards, travel tickets, etc., are described, the data being written into a magnetic layer. According to the method, physical authenticating features of the data carrier are evaluated as inhomogeneities in the magnetic layers which carry the data. Suitable data carriers comprise an individual and characteristic inhomogeneity produced, for example, by fluctuations in thickness, discontinuities (13) etc. The second side of the data carrier (1) is provided with an absorbent coating (15) which serves to receive ink sprayed on by an ink jet printer. For reading and/or coding the data carriers which are provided with two magnetic strips (12, 12') independently of the position of the data carriers, there are in an apparatus two reading-writing heads (60, 60') and two pressure applying rollers (61, 61°) disposed in a longitudinally symmetrical relationship and also a station (70) for reversing the data carrier (1). Movable transversely to the direction of movement of the data carrier (1) are an ink jet printer (30) and an optical reading head (40). Furthermore, the apparatus comprises a device (8) for opening up a fixing clip (4) from the data carrier (1) which, after processing, is again fixed and ejected again jointly with the data carrier (1).

34 Claims, 5 Drawing Sheets

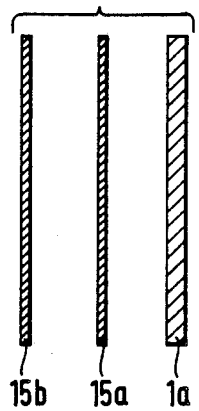
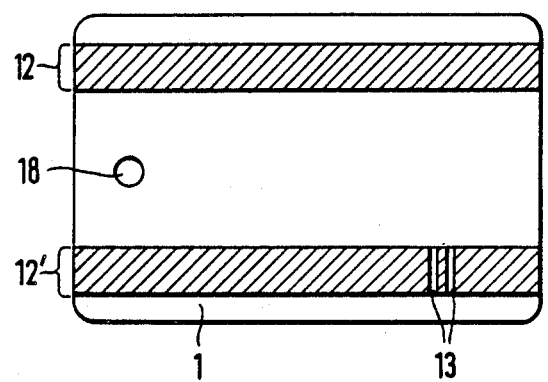
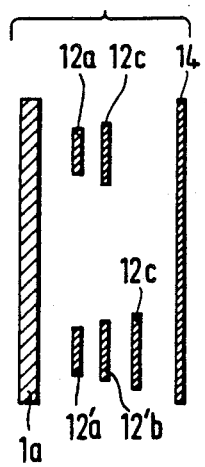
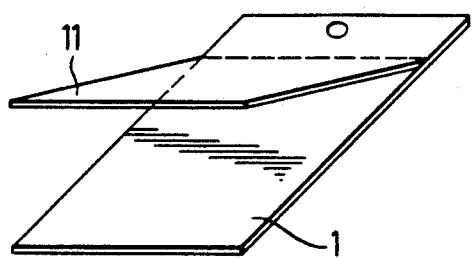
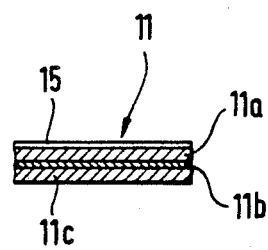

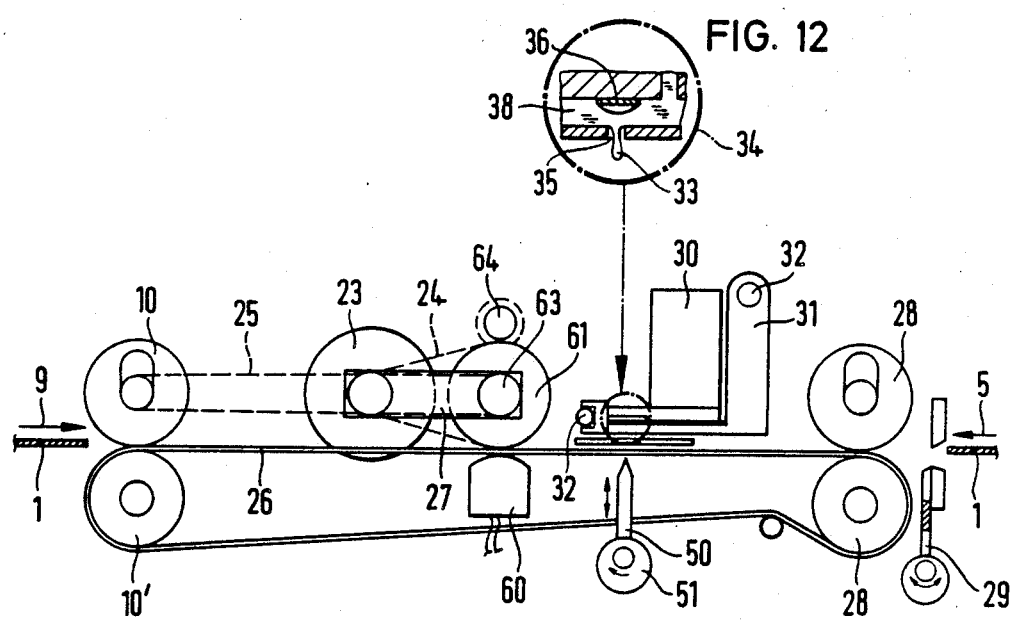
FIG. 11
FIG. 12
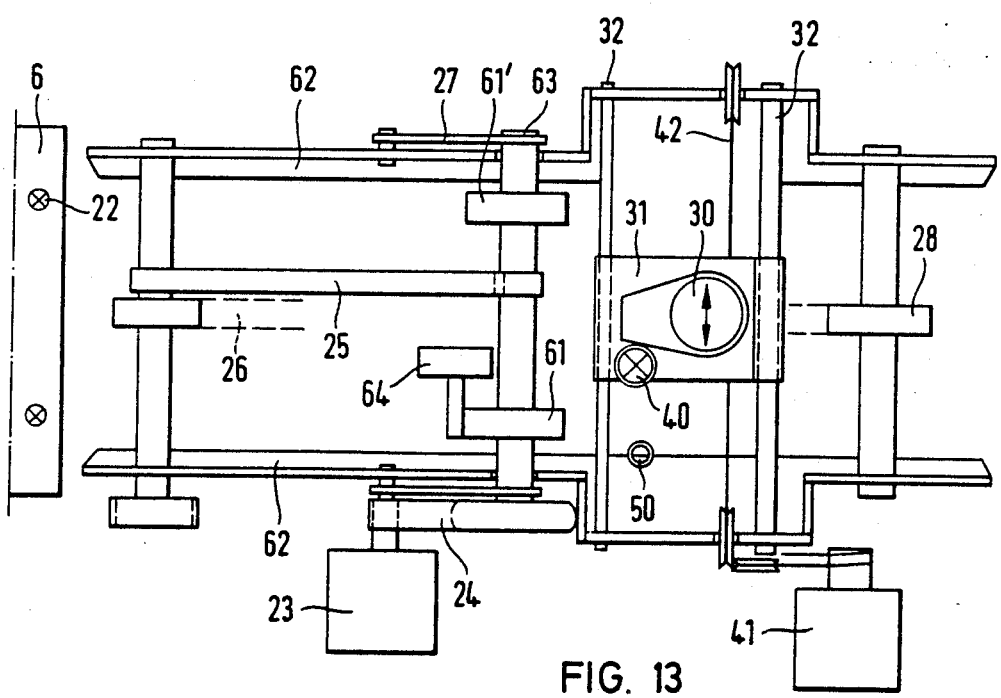
FIG. 13

METHOD OF FORGERY-PROTECTING A DATA CARRIER, A FORGERY-PROTECTED DATA CARRIER AND APPARATUSES FOR HANDLING, PROCESSING AND MONITORING THE DATA CARRIER

As a rule, magnetic cards are used as data carriers. To safeguard these magnetic cards against forgery, the data entered into a magnetic track is in most cases codified by a more or less complicated method. It is true that amendment or falsification of the data on the magnetic card can, in consequence, be largely prevented. However, the actual problem of forging a magnetic card resides in the fact that copying the contents of a valuable data carrier onto the magnetic track of a data carrier of lesser value cannot be prevented by these measures. In order to prevent such forgery, it is necessary to evaluate physical features which represent the genuine nature of the data carrier.

For example, it is known for this purpose to provide in the data carrier an area having random but characteristic visual properties One known method employs the transmitted light method and stores the measured characteristic value jointly with the data. Where another method is concerned, characteristic and invididual changes are produced on the surface of the data carrier which are then evaluated in a Relfex (sic!) light. By this method, it is indeed possible to establish the physical genuineness of the data carrier with the data stored on a magnetic track or on some other storage medium, but the method is relatively unsafe. The essential problem of such visual methods of evaluating physical features of genuineness is the vulnerability to dirt. Furthermore, the considerable expenditure on the evaluating apparatus is a substantial disadvantage.

It is furthermore also known to adopt safety measures which are separate from the magnetic track but which are likewise magnetic, whereby substantially arbitrarily and variously distributed and variously magnetic areas are provided so that the safeguard against falsification resides in the recognition, evaluation and checking of the magnetic properties which are detected. Such methods are disclosed substantially in DE-A-2245028 and 2745632 or GB-A-1244875 and US-A-3453598.

Cards carrying points are often used to provide access to swimming pools, cable railways, etc. In this respect, it is advantageous if, when entering, it is possible visually and legibly to devalue the entrance card or to increase the number of points which have been used up on the card. Therefore, the card proprietor acquires information about the number of points still left on the card and any interference with it is rendered difficult.

In the case of a known apparatus, thermolayers are applied to the cards on which an inscription can be made by a thermoprinter provided in the card monitoring device. Problems occur, for example, in that the cards are often inserted into the card monitoring device in a very dirty condition and the dirt may well damage the thermoprinter.

Similar devices have also become known in which the inscription is applied by means of a stamping printer and a coloured tape. Here, the disadvantage is that such a printer may carry only a small stock of symbols by virtue of the mechanical complication involved.

In cases where money is to be extracted from automatic cash dispensers, it is generally possible to insert the magnetic card in only one position so that when using such a device, for example within the context of an entrance monitoring system, only a very low rate of throughput is possible.

For monitoring or devaluing part of entitlement cards, these cards are often pulled completely through a mouthpiece. This has the disadvantage that when the ticket or entitlement card is pushed in or ejected from the monitoring device, it can be relatively easily lost.

In winter sports, entitlement cards, like ski passes, points cards, etc., are only partly used, since they have to be visibly fixed by a cord or such like to, for instance, the owner's garment. It is true that this protects the card from being lost and leaves it handly to use, but the construction of the monitoring device is complicated in that it must prevent premature withdrawal from the mouthpiece during the scanning or monitoring process.

The invention is therefore based on the problem of simplifying such a method and of providing a suitable as far as possible forgery-protected data carrier and apparatus for handling, processing and monitoring this data carrier.

According to the invention, it is to this end envisaged that lack of homogeneity in the magnetic coatings of the data carrier should be assessed as features of genuineness.

Such lack of homogeneity can be protected relatively easily in respect of mechanical stresses, whereas dirt does not adversely affect the certainty of assessment.

It is advantageous to assess as a feature of genuineness fluctuations in the thickness of a magnetic coating. In a preferred method, a first stage is to apply a constant magnetic field to the magnetic coatings while in a second stage the magnetic coatings are scanned and any signals induced by lack of homogeneity therein are evaluated as authenticating features.

A data carrier for carrying out the method according to the invention is characterized in that a magnetic coating has characteristic imhomogeneities. Ideally, these are fluctuations in thickness. In a preferred example of embodiment, they can be achieved by forming the magnetic coating from two superimposed films, one of which has localised discontinuities. In another embodiment, it is possible for the magnetic coating to exhibit inhomogeneities in the form of magnetically inactive pigments or substances.

In any case, it is ideal for the magnetic coating to be covered by a coloured film.

A further preferred embodiment provides for one side of the data carrier to have a magnetic coating to receive machine-readable data while the other side of the data carrier has an absorbent coating to receive a visually readable identification. Above all, the visual and machine readability of the data carrier are improved even under difficult environmental conditions.

For easiest possible handling of the data carrier, it is advantageous of the magnetic coating is in the form of two magnetic strips extending outside of the axis of symmetry of and parallel with one edge of the card-shaped data carrier.

In order to permit reading or writing of such data carriers, particularly of those which are of differing thicknesses or which carry embossings or the like, with the least possible mechanical complication, a first embodiment of an apparatus according to the invention provides for the data carrier to be guided in a channel and moved between two reading-writing heads and two pressure-applying rollers, one reading-writing head and one pressure-applying roller being disposed in a longitudinally symmetrical relationship on each of the two sides of the channel, in the same direction and in the same transverse plane, the two reading-writing heads being rigidly fitted while the pressure-applying rollers are flexibly or movably mounted.

By reason of this measure, it is possible then to read the data carriers perfectly even if the card is inserted in such a way that it is rotated through 180° within its plane. Also a raised embossing on the body of the card adjacent the magnetic track will not impede perfect magnetic reading if the card is constructed according to the invention.

in this respect, it is advantageous for the two pressure-applying rollers to be driven. The rollers can be mounted on a common axis which is mounted movably at its ends and which is pressed in the direction of the magnetic heads.

Preferably downstream of the reading and writing unit is a reversing station for the data carrier, by means of which the position of the top and bottom sides is reversible. Thus, the data carrier can be inserted in any position.

It is furthermore advantageous to provide in the channel an ink jet printer which is movable in the direction of movement of the data carrier. In consequence, alterations to the magnetic identification or uses of the card can also be printed in visually legible manner on the absorbent coating.

The essential advantage of an ink jet printer is that the inscription is made without contact. Therefore, any particles of dirt present on the surface of the data carrier cannot damage the printing head. Accordingly, the apparatus according to the invention offers a very high level of functional reliability. A further advantage is the depiction of any desired graphic impression on the surface of the data carrier.

A preferred embodiment of the invention is characterised in that a visual reading head is mounted for movement jointly with the ink jet printer. This has the advantage that any functional breakdowns of the printer can be detected immediately. Any manipulation aimed at preventing the ink engaging the surface of the data carrier is rendered substantially more difficult by this measure.

Preferably, the optical scanning head is constructed as a bar code reader, so that also optically or visually readable identifications can be read mechanically.

Furthermore, it is advantageous to provide an embossing ot stamping device by means of which the data carrier is lastingly deformed. Thus visually readable identifications can be additionally safeguarded. Even if the inscription is subsequently scratched off, the lasting deformation ensures that any accoutning process or use can be evidenced.

The problem described at the outset, relating to complete drawin of data carriers which are suspended from a cord can in a further embodiment of apparatus according to the invention be resolved in that the data carrier can be pulled through a mouthpiece which comprises a device for detaching a fixing clip from the data carrier.

Thus, simple handling is assured, the card is protected against being lost and nevertheless complete draw-in of the data carrier into a monitoring device is possible.

Advantageously, the device for removing the fixing clip comprises a push rod which can be actuated magnetically or by an electric motor and by means of which one catch on the fixing clip can be separated from the data carrier.

A fixing clip for use in the apparatus according to the invention is characterised in that a springingly pretensioned catch, when in the inoperative position, engages a corresponding recess in the data carrier.

Advantageously, this catch can be constructed on an arm of a lever, the second arm of which, in the position of rest, extends in an acute angle to the plane of the data carrier so that by introduction of the fixing clip into the mouthpiece, the second arm of the lever encounters a projection on the mouthpiece.

According to a preferred embodiment of the invention, the catch on the fixing clip is magnetic or is alternatively coupled for movement together with a magnet, corresponding in turn to a magnet in the mouthpiece. Thus, when the fixing clip is inserted into the mouthpiece, the catch can be moved into its open position.

In order to improve the resistance of the inscription of an ink jet printer, a printing method is proposed in which the ink on the one hand and the surface coating on the other comprise a preliminary dyestuff product and a developer which, when reacted with each other, produce a coloured image.

As a result of this measure, the additional advantage that the inscription of the print carrier by any desired ink jet printers is not possible or detectable. Therefore, any manipulation or or supplement to the inscription will be recognised.

Preferably, the surface coating of the print carrier contains the developer and the ink of the preliminary dyestuff product.

An advantageous preliminary dyestuff product is a ferrous-III-compound, while the developer contains an acid component.

Document-genuine inscriptions can be obtained by means of such an ink jet printer.

However, other dyestuffs or their preliminary products may also be used. For example, those which are based on diazo compounds may be used.

The invention will be explained in greater detail hereinafter with reference to an embodiment in a system for monitoring and identifying cards of value. The invention can also be used in any other systems, for example in monitoring entries, in checking goods, etc., just as individual components of the system can be altered.

In the accompany drawings:

FIGS. 6 to 8 show the construction of the card of value;

FIG. 9 shows an embodiment of a value card having an adhesive strip for attachment of a photograph;

FIG. 10 shows the layered structure of the adhesive strip;

FIG. 11 is a diagrammatic cross-section through the apparatus for reading and identifying the value card;

FIG. 12 shows a detail of an ink jet printer;

FIG. 13 is a plan view of this apparatus;

Figure 16:
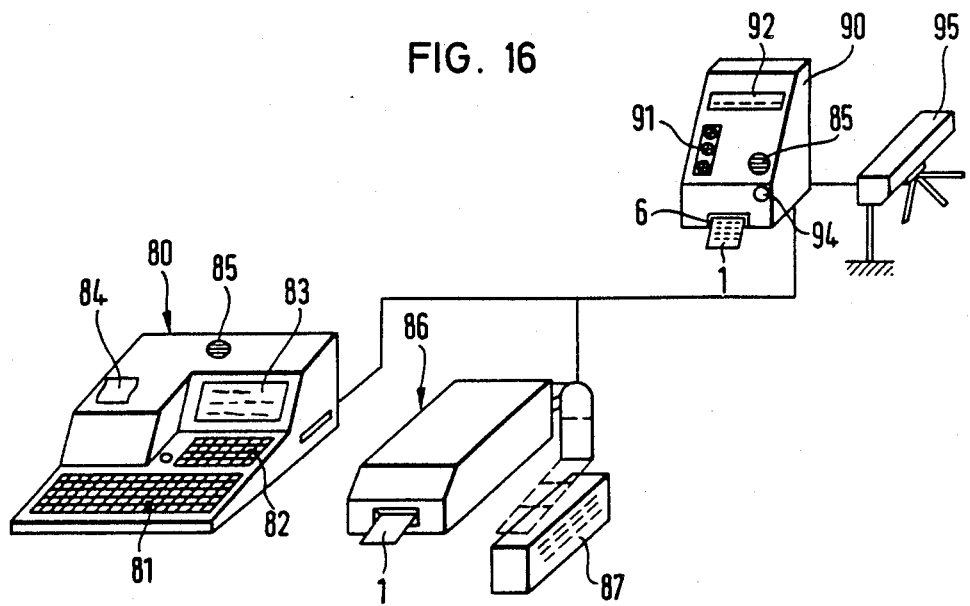
FIG. 16 shows the components of a system for identifying and reading or devaluing a value card.

As FIG. 16 shows, the data carriers 1 which take the form of value cards are issued by an issuing device 86. This device draws the cards in from a card store 87, inscribes them in a visually legible manner and writes in the basic information, for example the value of the card, the number of times it can be used for admission purposes, etc., in a machine readable fashion onto a magnetic strip. Then, the cards are ejected. This card issuing device 86 is controlled by an issuing computer 80. The issuing computer 80 comprises an alphanumeric keyboard 81 and a function keyboard 82. These keys can be used to input the desired basic information. Inputting and the relevant operations are indicated by a display 83. Furthermore, the dispensing computer 80 comprises a voucher and a journal strip printer 84. For monitoring or devaluing the data carrier 1, there is at the appropriate stations a card monitoring device 90. This card monitoring device 90 comprises a mouthpiece 6 for the insertion of the data carrier 1. After insertion of the data carrier 1, the basic information thereon is read magnetically and, according to the type of card or the type of entitlement involved, so a turnstile 95, for example, is released. At the same time, the value of the card is reduced, the amount consumed is printed on in visibly legible fashion and the card is reissued. For communication with the card holder, the card monitoring device 90 also has a lamp assembly 91 and a display 92. The latter may be used, for example, to display information in the event of improper operation, etc.

Furthermore, the card monitoring device 90 and the issuing computer 80 are connected to each other via an intercom system 85. In the event of any problems, the card user may press a call button 94 and thus be connected to the operating personal. The individual components, particularly the dispensing computer 80 and the card monitoring device 90 can be connected directly to one another electrically but function is possible even without a direct connection. The arrangement illustrated here is only a simple example. As a rule, such a system will include a plurality of card monitoring devices and a plurality of dispensing stations.

Figure 1:
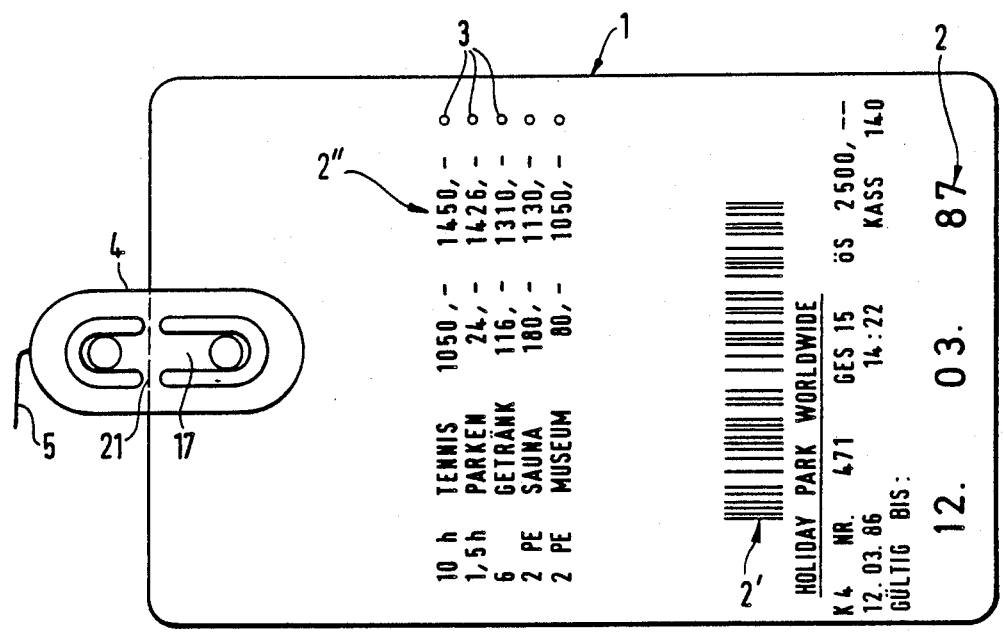
FIG. 1 is the plan view of a data carrier constructed as a value card and having a fixing clip.

FIG. 1 shows the plan view of one side of the data carrier 1 which takes the form of a value card. This side carries a visually legible identification 2, in which the basic information is contained. The basic information comprises, for instance, the expiry date of the card, its value, issue time, etc. Furthermore, these data are also registered in the form of a visually legible bar code 2'. This is shown in the text lines 2". Furthermore, each line of text is additionally identified by stamping 3. This has the advantage that in the event of any manipulations of the visually legible identification, the number of debiting operations can be perfectly evidenced.

Figure 2:
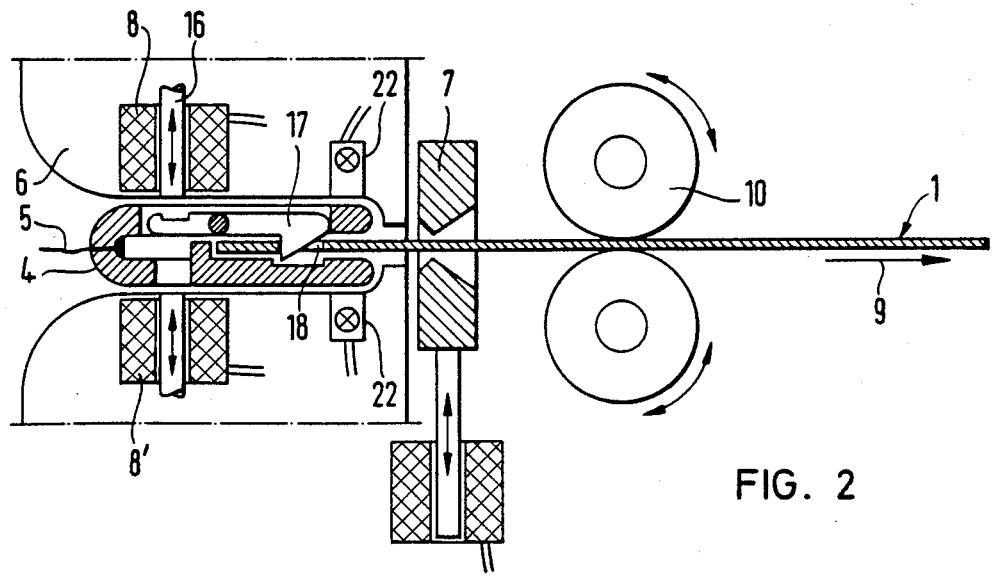
FIG. 2 shows a cross-section through this card upon insertion into the mouthpiece of an apparatus for reading and identifying the card.

The data carrier 1 is connected by a fixing clip 4 to a cord which in turn may be fixed, for instance, to a garment of the card holder. It is particularly advantageous if the cord 5 runs into an automatic wind-up device so that under normal circumstances the card remains visible and is carried directly on the body. When in use, the cord 5 can then be pulled out from the wind-up device, not shown, and the card therefore inserted into the mouhtpiece 6 of the card monitoring device 90. FIG. 2 shows this process diagrammatically in cross-section, only some elements of the card monitoring device 90 being shown.

The fixing clip 4 consists of a U-shaped synthetic plastics part in which a catch 17 is mounted with a resilient initial tension. The catch 17 is here constructed in one piece with the synthetic plastics part, in a cut-out therein, the connecting webs 21 acting as torsion springs. In the position of rest, the catch 17 engages an eyelet 18 in the data carrier 1. When the card is inserted into the mouthpiece 6 of the card monitoring device 90, photoelectric barriers 22 disposed in the insertion slot recognise the insertion of the card. In consequence, a sliding shutter 7 over the insertion slot of the mouthpiece is opened. The draw-in rollers 10 of a transport mechanism grip the card and pull it in the direction of the arrow 9. When the fixing clip 4 comes in contact with the mouthpiece 6, a device for detaching the fixing clip from the data carrier 1 is actuated. This device, in the embodiment shown in FIG. 2, consists of push members 16 disposed one above and one below the plane of the card and adapted to be actuated by an electromagnet 8. By movement of the push member 16 towards the plane of the card, the catch 17 is lifted and releases the card. At the same time, the attachment or fixing clip is secured to safeguard it against unintended withdrawal from the mouthpiece 6. After reading, identifying and possibly devaluing the card, this latter is again inserted by the transport mechanism or rollers 10 into the fixing clip 4 in the direction opposite to that of the arrow 9. Then the push members 16 are retracted and the card can be ejected again.

It is readily obvious that the operation of a card monitoring device is substantially simplified by such an arrangement.

Figure 3:
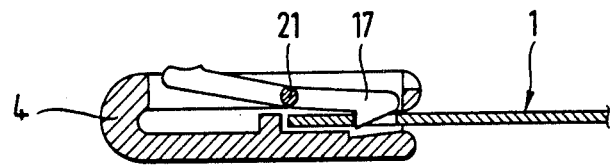
FIG. 3 shows the cross-section through a further embodiment of a fixing clip in the closed state.
Figure 4:
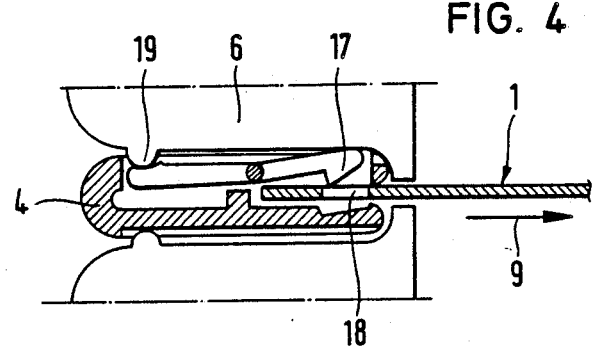
FIG. 4 shows this fixing clip in the opened state.

FIGS. 3 and 4 show an alternative form of fixing clip. FIG. 3 shows in this case the fixing clip in the inoperative position. The catch 17 is constructed on one arm of a lever. The second arm of the lever extends at an acute angle to the plane of the data carrier 1. When the value card is inserted into the mouthpiece 6, this second arm encounters a projection 19 which rotates the lever about the torsion spring 21 which is constructed as a spindle. In consequence, the catch 17 is disengaged from the eyelet 18 of the card and releases it. When the card 1 is ejected from the mouthpiece 6, it takes the fixing clip back with it, so that the lever swings into its inoperative position and the catch 17 engages the eyelet 18 in the card.

Figure 5:
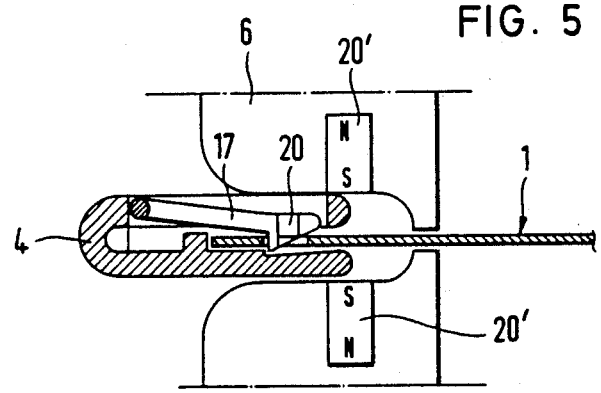
FIG. 5 shows a further alternative form of fixing clip for a card of value.

FIG. 5 shows a further example of a fixing clip 4 shortly prior to insertion into the mouthpiece 6. With this example, a permanent magnet 20 is let into the catch 17. In the mouthpiece there are once again, relevant to both planes of the data carrier 1, magnets 20' which, when the fixing clip 4 is fully inserted, lift the catch 17 magnetically so that the data carrier 1 is released.

The examples shown here make it possible to detach the fixing clip 4 regardless of the position in which the data carrier 1 is introduced into the mouthpiece 6. It goes without saying that it is also possible for the fixing clip 4 and the device for opening the same in the mouthpiece to be so constructed that the clip opens only in one specific position. This is advantageous, for instance, if the card control device requires the value card to be inserted in one specific position. For such a case, it is furthermore possible for the fixing clip 4 and the card to be so correspondingly constructed that both elements can be connected to each other only in one certain position.

FIG. 7 shows the side of the data carrier 1 which is opposite that which carries the visual identification, while FIGS. 6 and 8 show a diagrammatic cross-section through the construction of the two sides of the card. The data carrier 1 consists of a basic body 1a provided on one side with an absorbent coating 15. Particularly suitable for the basic body 1a is cardboard or, if the card is to be exposed to fairly heavy stresses, then synthetic plastics or bonded materials. If the basic body of the card consists of synthetic plastics material, then it is advantageous if, according to FIG. 6, the absorbent coating 15 consists of two films 15a and 15b. The film 15a serves then particularly to provide the adhesive property while the film 15b can be designed for good absorption capacity.

According to FIG. 8, there is on the second side of the basic body 1a a magnetic strip 12 which consists of a magnetic layer 12a masked by a covering layer 12c which is, for instance, white in colour. The entire surface of the card can be masked, for example, by a protective varnish 14. The magnetic strip 12 serves to receive a machine-readable identification or coding in known manner. If the quantity of data which can be stored in the strip 12 is not sufficient, then possibly a second magnetic strip 12' can be provided.

An example of the forgery-protection of the value card will be explained in greater detail hereinafter with reference to this second magnetic strip 12'. It goes without saying that the forgery-protection measures represented here can be constructed on a single magnetic strip which is intended to receive the data. The magnetic strip 12' consists of a first film 12'a in which there are breaks 13. This first film 12'a is then covered over its entire surface, in other words also in the region of the breaks 13, by the coloured covering layer 12c. In the embodiment shown, the discontinuous film 12'a is covered by a second film 12'b with a magnetic coating. On the second film 12'b there is in turn an inactive covering layer 12c. The magnetic strip 12' which is thus constructed therefore has in the region of the breaks 13 inhomogeneities in the form of fluctuations in thickness. These inhomogeneities are visually not visible.

However, the inhomogeneities can also be produced in another way, for example by admixing magnetically inactive bodies or pigments into the magnetic layer.

If, then, this magnetic strip 12' is exposed to a constant magnetic field and then read, then the inhomogeneities occasioned by the interruptions or breaks 13, by varying the magnetic flow, induce an electrical signal in the reading head which can be evaluated as an authenticating feature. For example, the number of electrical pulses and their location relative to a fixed point on the card can be assessed. In this way, one obtains a physical authenticating feature in the card since, for example, the number and location of the breaks 13 can be individually disposed on each value card. The magnetic strip 12' can, however, be used quite normally for storing data. This method is not restricted to the example shown here. All that is esssential is that after exposure of the magnetic layer to a constant field during the reading process, characteristic signals are produced which are occasioned by inhomogeneities. Another substantial advantage is that no special devices are needed for recognition of genuineness and that even if the card is dirty or worn, evaluation is entirely possible. Evaluation can also take place by the application of an alternating magnetic field, in which case, then, variations in signal are produced by the inhomogeneities.

FIGS. 9 and 10 show an alternative embodiment of the data carrier 1 which can be associated with a specific person, for example by the incorporation of a photograph. For this purpose, the card has on one side an adhesive tag 11 which is connected to the basic body 1a on only a part of its surface. According to FIG. 10, the adhesive tag 11 consists of a siliconised masking film 11c, an adhesive pad 11b, a transparent film 11a and the outer transparent and absorbent coating 15. For attachment of a photo, the masking film 11c can be removed, the photo inserted and the adhesive tag pressed against the basic body 1a. Inscription is possible on the absorbent coating 15 both before and also after insertion of the photograph.

FIG. 11 shows a diagrammatic cross-section and FIG. 13 a plan view of the apparatus for reading and identifying data carriers 1 such as are used, for example, in the card issuing device 86. This apparatus comprises a transport mechanism for moving the cards. The transport mechanism consists of a continuous belt 26 which is mounted on two rollers 10' and 28. The roller 10' is coupled by gearwheels to a counter-pressure roller 10 which is in turn driven via a belt 25 by a shaft 63. The shaft 63 is connected by a belt 24 to a motor 23. If, for example, a value card not shown in the drawing is fed in the direction of the arrow 55, then it is gripped by the two rolles 28 and, resting on the belt 26, is fed into a first station for optical or visually readable identification, after which it is moved through a station for magnetic coding and is finally ejected via the rollers 10 and 10'. If the cards are fed endlessly, then they can be separated into individual cards by a cutting device 29.

Figure 14:
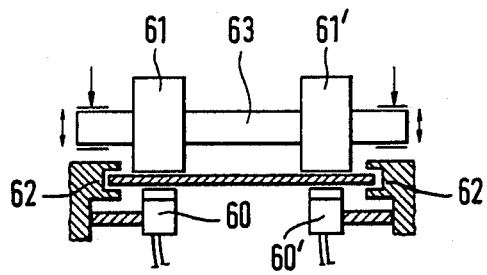
FIG. 14 shows a cross-section through this apparatus in the region of a magnetic reading or writing unit.

The same device can also be used in the card monitoring apparatus 90. Then, the cards are as a rule inserted in the direction of the arrow 9. It is, however, immaterial in which direction the cards are fed. It is readily obvious that the transport mechanism can draw in and eject the cards in any desired direction. While the value cards are moving, they are guided in a channel formed by two guide rails 62. For magnetic coding or for reading magnetic cards, there are on the shaft 63 two pressure-applying rollers 61 which are symmetrical to the central axis of the channel. The shaft 63 is, as can be seen also in FIG. 14, mounted at its ends for movement in a rocker 27. The rocker 27 is rotatable about the central axis of the motor 23. The pressure-applying rollers press the card against rigidly fixed correspondingly disposed magnetic reading or writing heads 60. The speed of movement of the data carrier 1 is measured by a pulse generator 64 at one of the pressureapplying rollers 61. Thus, data carriers 1 can be magnetically read and inscribed with their magnetic strips parallel with one edge of the card and outside of the axis of symmetry of the card, regardless of whether the card is rotated in its plane or not.

Figure 15:
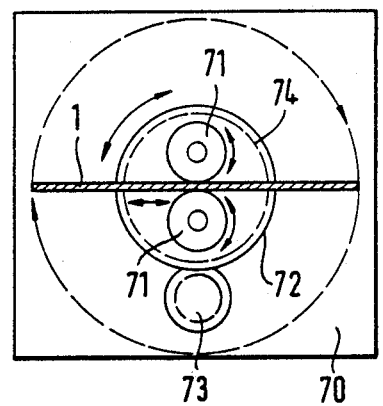
FIG. 15 shows the diagram of a reversing station for the value card.

If this device is used for card monitoring and not for issuing cards, then it frequently happens that the data carriers 1 are inserted the wrong way round, i.e. with the magnetic layer towards the pressure-applying rollers. So that such cards can also be read perfectly under such circumstances, the apparatus described has on its downstream side a reversing station 70 which is shown diagrammatically in FIG. 15. This reversing station 70 comprises two draw-in rollers 71 for the data carrier 1, the rollers being accommodated in a rotatable mounting 74. This mounting 74 can be rotated through 180° by means of a pinion 73. Consequently, both sides of the card can be interchanged. For example, if a card 1 is inserted the wrong way round, then it passes through the transport mechanism of the device for reading and identifying and arrives at the reversing station 70, where the sides of the card are changed round and the card is inserted again into the transport mechanism. Magnetic reading or identification can then follow.

Within the transport mechanism is a station for visually or optically readable identification of the data carrier 1. This station comprises a carriage 31 which is adapted for movement transversely of the direction of movement of the cards. The carriage 31 is to this end mounted on guide rails 32 and can be moved by means of a cable arrangement 42 and a motor 41.

An ink jet printer 30 fixed in the carriage 31 inscribes the absorbent coating 15 of the card in a visually or optically readable form.

Mounted on the carriage 31 is an optical reading head 40 which is adapted for movement jointly with the ink jet printer 30. Thus it is possible to establish whether the ink jet printer is working perfectly, i.e. whether the inscription is legible. If the optical reading head is constructed as a bar code reader, then also mechanically readable information can be applied in the form of a bar code and evaluated.

Furthermore, there is in the same plane an embossing arrangement consisting of a push rod 50 and a cam 51. By means of this embossing arrangement, lines of inscription provided on the card 1 can be identified by an embossing or a lasting deformation of the data carrier 1. Thus, any manipulations are prevented because even after complete removal of the visually readable identification, it is still possible to recognise that a change has been made to the value of the card.

Shown on an enlarged scale in FIG. 12 is a jet 34 of the ink jet printer 30, in order to explain in greater detail the manner in which it functions. This jet consists of a jet aperture 35, an ink duct 38 and a heating element 36 located behind the jet aperture. Brief heating of this heating element 36 forms in the ink a vapour bubble which accelerates a drop 33 of the ink through the jet aperture 35. This drop then strikes the absorbent coating 15 on the card. By correspodningly controlling and moving the ink jet printer 30, so symbols or inscriptions are formed in the same way as by a matrix printer.

The ink on the one hand and the coating 15 on the data carrier 1 on the other contain a preliminary dyestuff product and a developer. When the ink strikes the surface coating, the preliminary dyestuff product and the developer come in contact so that when these two components react, a colour is formed.

It is advantageous if the coating 15 contains the developer on the data carrier 1 while the ink contains the preliminary dyestuff product. Suitable preliminary dyestuffs products are, for example, a ferrous-III-compound while the developer may contain an acid component. For example, gallic acid or a phenolic compound may be used for this purpose.

It goes without saying that other already developed dyestuffs or dyes in the form of pigments may be admixed with the ink.

This development ensures that an inscription of the value card by any desired dyestuffs is recognisable because the components contained in the ink and in the coating form colours having characteristic absorption properties. For the surface coating, for example, a suitable binder is polyvinyl alcohol, a suitable pigment is silica gel, while suitable developers are phenol resins, acid clays, kaolin or the like.

It is readily obvious that the above-described system explains only one concrete instance of application of the invention. The invention is not, however, restricted to it. Instead, individual components of the system or application can be varied in many ways.

What is claimed is:

1. Forgery-protected data carrier with physical authenticating features in the form of characteristic inhomogeneities of a magnetic layer of the data carrier, the magnetic layer comprising at least two superimposed films having substantially identical magnetic properties, whereby at least one of said films has localized discontinuities producing said characteristic inhomogeneities.

2. Data carrier according to claim 1 wherein the localized discontinuities form a fluctuation in thickness of the magnetic layer.

3. Data carrier according to claim 1 wherein the magnetic layer comprises inhomogeneities in the form of magnetically inactive pigments or bodies.

4. Data carrier according to claim 1 wherein the magnetic coating is masked by a coloured film.

5. Data carrier according to claim 1 wherein the magnetic layer is arranged on one side of the data carrier to receive machine readable data while the other side of the data carrier carries a coating absorbent to liquid ink to received an optically readable identification.

6. Data carrier according to claim 5 wherein the absorbent coating is transparent and is applied to the surface of a transparent adhesive film which is glued onto a basic body of the data carrier.

7. Data carrier according to claim 5 wherein the absorbent coating contains a binder, a surface enlarging pigment and a developer for a preliminary dyestuff product.

8. Data carrier according to claim 6 wherein the absorbent coating contains a binder, a surface enlarging pigment and a developer for a preliminary dyestuff product.

9. Data carrier according to claim 1 wherein the magnetic layer takes the form of two magnetic strips which extend parallel with one edge of the data carrier and outside its axis of symmetry.

10. Apparatus for reading and/or identifying card-shaped data carriers having a magnetic layer, comprising a transport mechanism with a guiding channel for the linear movement of the data carrier and a reading and identifying means comprising at least one magnetic reading-writing head and an ink jet printer adapted for movement transversely to the direction of movement of the data carrier.

11. Apparatus according to claim 10 wherein an optical reading head is adapted for movement jointly with the ink jet printer.

12. Apparatus according to claim 11 wherein the ink jet printer and the optical reading head are fixed on a common carriage which is adapted for motorized movement along guide rails.

13. Apparatus according to claim 11 wherein the optical reading head is a bar code reader.

14. Apparatus according to claim 12 wherein the optical reading head is a bar code reader.

15. Apparatus for reading and/or identifying card-shaped data carriers having a magnetic strip outside its longitudinal axis of symmetry, comprising a transport mechanism having a guiding channel and two pressure-applying rollers, and a reading and identifying means having two magnetic reading-writing heads juxtaposed the pressure-applying rollers and an ink jet printer adapted for movement transversely to the direction of movement of the data carrier, there being in a longitudinally symmetrical relationship one read-writing head and one pressure-applying roller disposed on each of the two sides of the guiding channel the two reading-writing heads being rigidly fixed while the pressure-applying rollers are movable or resiliently mounted.

16. Apparatus according to claim 15 wherein both pressureapplying rollers are driven.

17. Apparatus according to claim 15 wherein both pressureapplying rollers are mounted on a common shaft and are mounted for movement by means of a rocker.

18. Apparatus according to claim 16 wherein both pressureapplying rollers are mounted on a common shaft and are mounted for movement by means of a rocker.

19. Apparatus for reading and/or identifying card-shaped data carriers having a magnetic layer, comprising a transport mechanism with a guiding channel for the liner movement of the data carrier and a reading and identifying means comprising at least one magnetic reading-writing head and an ink jet printer adapted for movement transversely to the direction of movement of the data carrier, the transport mechanism comprising a guiding channel having a mouthpiece, in which a device for opening up a fixing clip attached to the data carrier is arranged.

20. Apparatus according to claim 19 wherein the device for opening up a fixing clip comprises, adapted for magnetic or electric motor actuation, a push member by means of which a catch on the fixing clip can be released from the data carrier.

21. Apparatus according to claim 10 wherein the reading and identifying means is followed by a station for reversing the top and bottom sides of the data carrier.

22. Apparatus according to claim 15 wherein the reading and identifying means is followed by a station for reversing the top and bottom sides of the data carrier.

23. Apparatus according to claim 19 wherein the reading and identifying means is followed by a station for reversing the top and bottom sides of the data carrier.

24. Fixing clip for a card-shaped data carrier, comprising a resiliently pretensioned catch which in the inoperative position engages a corresponding recess in the data carrier.

25. Fixing clip according to claim 24 wherein the catch is constructed on one arm of a two-armed lever, the second arm of which, in the position of rest, extends at an acute angle out of the plane of the data carrier, the second arm being pivotable into the plane of the data carrier when inserted into a mouthpiece of a reading and identifying means, thereby disengaging from the recess in the data carrier.

26. Fixing clip according to claim 24 wherein the catch is magnetic or is coupled for positive movement together with a magnet, the catch being adapted for movement by a magnetic field out of its inoperative position into an open position in which the data carrier is released.

27. Apparatus according to claim 10 wherein there is in the guiding channel an embossing or stamping device for the lasting deformation of the data carrier.

28. Apparatus according to claim 15 wherein there is in the guiding channel an embossing or stamping device for the lasting deformation of the data carrier.

29. Apparatus according to claim 19 wherein there is in the guiding channel an embossing or stamping device for the lasting deformation of the data carrier.

30. Data carrier to be used with an apparatus according to claim 10 wherein one side of the data carrier carries a magnetic layer to receive machine readable data while the other side of the data carrier carries an coating absorbent to liquid ink to receive an optically readable identification.

31. Data carrier according to claim 30 wherein the absorbent coating is transparent and is applied to the surface of a transparent adhesive film which is glued onto a basic body of the data carrier.

32. Data carrier to be used with an apparatus according to claim 15 wherein one side of the data carrier carries a magnetic layer taking the form of two magnetic strips which extend parallel with one edge of the data carrier and outside its axis of symmetry.

33. A method of forgery-protecting an in particular card-shaped data-carrier, the data of which are written into a magnetic layer, physical authenticating features in the form of characteristic inhomogeneities in a magnetic layer of the data carrier comprising,
 (a) providing a data carrier having a magnetic layer comprising at least two superimposed films having substantially identical magnetic properties,
 (b) exposing the magnetic layer to a constant magnetic field,
 (c) reading the magnetic layer,
 (d) evaluating the signals induced by the inhomogeneities in the magnetic layer, and
 (e) determining the physical authenticating features.

34. A method according to claim 33, characterized in that fluctuations in thickness of the magnetic layer are assessed as authenticating features.

* * * * *